United States Patent

Mercade

[15] 3,701,417

[45] Oct. 31, 1972

[54] PURIFICATION OF CLAY BY SELECTIVE FLOCCULATION

[72] Inventor: Venancio V. Mercade, Metuchen, N.J.

[73] Assignee: Engelhard Minerals & Chemicals Corporation, Township of Woodbridge, N.J.

[22] Filed: Sept. 28, 1970

[21] Appl. No.: 76,219

[52] U.S. Cl. ................... 209/5, 106/288 B, 23/110 P
[51] Int. Cl. ................................................ B03d 3/06
[58] Field of Search ..209/5; 23/312 P, 3, 3 D, 110 P; 106/72, 288 B; 210/54

[56] References Cited

UNITED STATES PATENTS

| | | | |
|---|---|---|---|
| R14,583 | 1/1919 | Schwerin | 209/5 |
| 667,222 | 2/1901 | Ivery | 209/5 |
| 2,353,055 | 9/1944 | Cahn | 209/5 X |
| 2,660,303 | 11/1953 | Maseman | 209/5 |
| 2,981,630 | 4/1961 | Rowland | 209/5 X |
| 3,138,550 | 6/1964 | Woolery | 209/5 |
| 3,446,348 | 5/1969 | Sennett | 209/5 |
| 3,371,988 | 3/1968 | Maynard | 23/110 P |
| 3,418,237 | 12/1968 | Booth | 209/5 X |

FOREIGN PATENTS OR APPLICATIONS

| | | | |
|---|---|---|---|
| 236,087 | 7/1925 | Great Britain | 209/5 |

*Primary Examiner*—Frank W. Lutter
*Assistant Examiner*—Robert Halfer
*Attorney*—Melvin C. Flint and Inez L. Moselle

[57] ABSTRACT

To remove a colored titania impurity from kaolin clay, the impure clay is formed into a well-deflocculated aqueous slip. A small amount of a soluble source of polyvalent cations, e.g., calcium chloride, is dissolved in the slip. An anionic organic polyelectrolyte is added and the slip is agitated until titania-rich flocs form and settle out from the deflocculated slip. The flocs are separated from the deflocculated slip of purified clay.

9 Claims, No Drawings

PURIFICATION OF CLAY BY SELECTIVE FLOCCULATION

BACKGROUND OF THE INVENTION

Sedimentary kaolin clay is frequently contaminated with a small amount of a colored titaniferous impurity which detracts from the brightness and value of the clay. Some of the premium grades of kaolin clay presently available have improved brightness as a result of the removal of a substantial proportion of the titania by selective froth flotation. It has been proposed to remove titania from kaolin clay by other means, such as by incorporating an excessive amount of a clay dispersant, to form a flocculated precipitate of the impurities in a deflocculated slip of the clay and separating the slip from the flocs.

These physico-chemical techniques for removing titania from clay leaves something to be desired.

Flotation may result in a beneficiated clay product containing undesirable residues of flotation reagents. The use of an excessive quantity of dispersant to flocculate selectively the impurity also leaves undesirable residues in the clay. Further the separation steps may be undesirably long and involve costly equipment and reagents.

THE INVENTION

An object of the invention is to provide a novel method for removing a titania impurity from kaolin clay, which method obviates some of the drawbacks of prior art physico-chemical techniques for effecting such separation.

A specific object is to provide a simple, effective method for purifying titania contaminated kaolin clay by selectively flocculating the titania from a deflocculated slip of the clay.

Further objects and features will be apparent from a description of the invention which follows.

Briefly, in accordance with this invention, finely divided colored titania impurity in kaolin clay is removed from the clay by forming the impure clay into a well-deflocculated aqueous slip, adding a small amount of a source of polyvalent cations, thereafter adding a water-soluble anionic polymeric flocculating agent, preferably a weakly anionic polyacrylamide flocculating agent, in amount sufficient to flocculate selectively the impurity without flocculating the clay, mildly agitating the slip until flocs form and separating the slip containing deflocculated purified clay from the flocs in which the discrete impurities are concentrated.

PRIOR ART

Polymeric flocculants have been used to clarify clay suspensions and to purify kaolin clay. For example, in Canadian Pat. No. 838,573, there is described a method for removing quartz impurity from clay by selectively flocculating the clay particles by means of an organic anionic polyelectrolyte. In the process of the invention, the impurity is flocculated rather than the clay per se. This is a more practical method of purification since it minimizes contamination of purified clay by reagents such as would occur if the clay, rather than an impurity, were flocced. Furthermore, entrapment of nonflocced matter is reduced by a process in which the minor constituent is flocced.

DESCRIPTION OF THE INVENTION

The process of the invention is useful in removing a titaniferous impurity from clay provided the impurity is discrete and may be liberated from the clay when the impure clay is agitated in aqueous media. Normally the titania impurity in kaolin clay is distinctly yellow or brownish-yellow. Such clays may contain impurities other than titania. In some instances, discrete impurities such as quartz and ferruginous matter are removed along with the titania impurity.

The impure clay must first be formed into a dilute well-deflocculated slip or suspension wherein both the clay and impurities are deflocculated. Normally grit (i.e., plus 325 mesh matter) is removed before selectively floccing the titaniferous impurity although this is not essential since the grit may be removed along with the flocculated impurities obtained in subsequent processing. Unfractionated clay or fine or coarse size fractions of degritted clay may be processed. In a presently preferred embodiment a deflocculated slip of unfractionated degritted clay is employed and a fine size fraction of purified clay is recovered after impurities are selectively flocculated therefrom.

Sodium silicate or hydrosols obtained by mixing small amounts of salts of polyvalent metal with sodium silicate have been used with success as deflocculants in the process of the invention. Other clay deflocculants include sodium hydroxide, sodium carbonate, ammonia and sodium salts of condensed phosphates. Mixtures of deflocculants may be used. When processing certain clays, such as the hard gray sedimentary Georgia kaolins, a mixture of sodium carbonate and sodium silicate (or hydrosol) is recommended. Sufficient deflocculating agent should be present to maintain minus 2 mesh clay particles in essentially permanent suspension.

Recommended is the formation of deflocculated slips containing 3 percent to 20 percent clay solids and having pH values within the range of 7 to 10, preferably a pH within the range of 8.0 to 9.5. When the pH is too low, it may be difficult to maintain the clay particles in the required deflocculated condition during the purification treatment and clay recovery will be adversely affected. On the other hand, the flocculation of titania may be hampered when pH is too high and insufficient separation of titania will result.

To the neutral or mildly alkaline well-deflocculated slip or suspension of impure clay a source of polyvalent cations is added. The source of the polyvalent cations must be one which is sufficiently ionized in the slip to supply an adequate concentration of polyvalent cations. Examples of polyvalent cations are calcium, magnesium, barium, zinc, lead, iron (ferrous and ferric), aluminum, titanium, manganese (manganous and manganic). Oxides, hydroxides and salts of polyvalent metals may be used provided they possess adequate solubility in the deflocculated slip. Metallic salts of monobasic acids, especially monobasic mineral acids and acetic acid, are preferred. Calcium chloride is especially recommended. The optimum concentration of polyvalent metallic cation varies with the species of polyanionic flocculant that is used and it also varies with the concentration of the polyanionic flocculant. Generally, the concentration of polyvalent cation is within the range of 10 to 200 p.p.m., more usually 50 to 100 p.p.m. Good results have been realized when employing a weight ratio of polyvalent cation to anionic polymer within the range of about 25 to 100/1.

It is preferably to add the source of polyvalent metal cations to the deflocculated slip in the form of a dilute aqueous solution, e.g., a solution of ¼ percent to 2 percent concentration. After addition of such solution the slip should be thoroughly agitated to assure uniform mixing. High shear mixing is suitable. It is believed that the polyvalent cations are selectively adsorbed by the titaniferous impurity, thereby reducing zeta potential and facilitating flocculation by the high molecular weight anionic polymer.

After addition of the source of polyvalent metallic cations, a water-soluble anionic organic polyelectrolyte having an average molecular weight greater than 10,000 is incorporated into the slip as a dilute (e.g., 0.01 percent to 0.5 percent) aqueous solution. The term "anionic organic polyelectrolyte" as used herein encompasses synthetic organic polymers which, when placed in an aqueous medium, ionize on the polymer molecule into a substantial number of anionic groups distributed at a plurality of positions on the molecule. Present experience indicates that the polymer should be a weakly anionic polymer rather than a strongly anionic polymer. Weakly anionic polymers contain both anionic and nonionic groups. In this case, anionic properties are imparted to synthetic organic polymers by the presence of side chains of carboxylic acid, carboxylic anhydride and carboxylic acid salt groups. Nonionic groups in a side chain in the polymer result from the presence of one or more of the following hydrophilic groups: carboxylic acid amide, carboxy alkyl ester, pyrrolidone, hydroxy, hydroxy alkyl ether and alkoxy. Preferred because of their commercial availability are high molecular weight weakly anionic synthetic polyacrylamides containing some replacement of amide by carboxylic groups. Such polyelectrolytes are prepared by copolymerization of acrylamide and acrylic acid or by the partial hydrolysis of polyacrylamide. Reference is made to "POLYELECTROLYTE ADSORPTION OF KAOLINITE," A. S. Michaels and O. Morelos, INDUSTRIAL AND ENGINEERING CHEMISTRY, Volumn 47, No. 9, page 1802, for a detailed description of a method for synthesizing hydrolyzed polyacrylamide (PAM) and for controlling the extent of partial alkaline hydrolysis.

An extremely low concentration of anionic polymeric flocculant is required to flocculate selectively the impurities in the slip of clay. Generally a concentration within the range of ¼ to 5 p.p.m., preferably ¾ to 4 p.p.m., suffices. When the concentration of polyelectrolyte is too low, or when the ratio of polyelectrolyte to metallic cations is too low, flocculation is inadequate. In extreme cases, no floccules form. When the concentration exceeds a desired value, the recovery of purified clay is impaired. At excessive concentrations there may be no selectivity since both the clay and the impurities will be flocculated. An optimum amount or range of synthetic organic polyelectrolyte can be readily determined by routine experimentation.

The pH of the slip may be reduced to a desired value by addition of an acid or acid salt before or after incorporating the synthetic organic polyanionic flocculating agent.

After a solution of synthetic organic polyanionic flocculant has been thoroughly mixed with the slip containing deflocculated clay and impurities, it is usually important to avoid vigorous agitation which will break up flocs and/or degrade the polyanionic substance. However, agitation should be sufficient to maintain the deflocculated clay particles in suspension while the flocs are forming. This mild agitation is continued at least until a visible colored sediment forms. In most instances floc formation and sedimentation occurs within ten minutes after incorporating the polyelectrolyte. After the sediment forms, the slip may be aged under quiescent conditions or under mild continuous or intermittent agitation to assure that the finer flocs have time to settle. Settling periods up to 48 hours or longer are suitable.

The slip of deflocculated purified clay is separated from the flocs by any suitable means such as decantation, siphoning, centrifuging, filtering. Combinations of such separation techniques may be employed. When the slip containing the flocs is quiescently aged before separation, it may be desirable to resuspend any particles of sedimented coarse clay before attempting to separate the slip from flocculated impurities.

When high clay recovery is desired, a portion of the clay that is entrapped in the flocs may be recovered by diluting the flocs with water, gently agitating the diluted flocs and decanting or otherwise removing the supernatant containing suspended clay. Further removal of titania and other impurities in the deflocculated slip of beneficiated kaolin may be effected by repeating the treatment with polyvalent metal cation and polyelectrolyte. As an alternative, the slips may be further purified by froth or other flotation or by high intensity wet magnetic separation.

When processing unfractionated kaolin clay or degritted unfractionated purified clay, the slip of purified clay may be fractionated by conventional means such as sedimentation or centrifugation to recover one or more fine size fractions. Fractionation results in a high brightness fine size fraction and a coarse size fraction which may be less bright than the fine size fraction but which is usually brighter than a coarse size fraction obtained by fractionating the unpurified whole clay.

Removal of colored titania effects a marked increase in clay brightness. In some cases it may be essential or desirable to further brighten the purified clay or a desired size fraction of the purified clay by chemical bleach or bleaches. The bleach reagent that is employed will depend on the nature of the residual impurities in the clay and may be a strong oxidizing agent, a strong reducing agent or combinations thereof. Normally the slip of purified clay is flocculated by addition of an acid or acid salt, and thickened by removal of water before bleaching.

The invention may be more fully understood by the following illustrative examples.

In the examples all parts are on a weight basis unless otherwise indicated. Brightness values represent results obtained by TAPPI Standard Method T-646 $m$-54, described in TAPPI, October 1954, pages 159-160A. The starting clay was a 20 percent solids slip of degritted hard gray sedimentary Georgia kaolin clay. This slip was prepared by blunging the crude clay in water and dispersing the blunged clay by adding sodium hydroxide, sodium carbonate and sodium silicate as described in U.S. Pat. No. 3,410,399 to Hunter. The dispersed slip was degritted over a 325 mesh screen and the minus 325 mesh slip was recovered and employed in the separation tests.

EXAMPLE I

A sample of the degritted slip containing 200 grams clay (dry clay basis) was diluted with deionized water to 5 percent solids. To prepare the slip for selective flocculation, there was added a hydrosol obtained by mixing 8.0 ml. of N sodium silicate solution diluted with water to 5 percent and 3.2 ml. of a 1 percent aqueous solution of alum. After addition of the hydrosol, the slip was intensively agitated for 5 minutes by means of an impeller agitator in a Fagergren flotation cell (air inlets closed). Three hundred and eighty ml. of a 0.1 percent aqueous solution of $CaCl_2 \cdot 2H_2O$ was added and the slip was agitated for 1 minute. The amount of $CaCl_2 \cdot 2H_2O$ that was added corresponds to 1.9 lb./ton clay. The calculated $Ca^{++}$ concentration was 0.026 g./l. The pH was about 9 after addition of the salt. A 0.01 percent solution of "Polyhall M-59" was incorporated into the slip in amount of 76 ml. (concentration of 0.0019 g./l.). "Polyhall M-59" is understood to be partially hydrolyzed polyacrylamide having a molecular weight between about 3 and 5 million and is represented by the suppliers as being a weakly anionic polymeric flocculating agent. After addition of the polyanionic flocculant, the slip was mildly agitated in a Lightnin' Mixer at low speed. Within 5 minutes the slip had separated into two distinct phases, a lower dark gray flocculated phase against a creamy background and an upper, apparently well dispersed white slip. After allowing the flocs to settle without agitation for 30 minutes, the deflocculated slip was siphoned from the flocculated colored sediment.

The deflocculated slip was then fractionated by sedimentation. A slip of minus 3 micron (equivalent spherical diameter) purified clay was recovered. One portion of the slip of minus 3 micron clay was dried, weighed and analyzed for brightness and $TiO_2$. Another portion of the slip of minus 3 micron purified kaolin clay was bleached by adding a 1 percent solution of $KMnO_4$ in amount of 2 lbs./ton clay, agitating for one hour at 180° F., adding 15 lbs./ton zinc hydrosulfite, agitating for 15 minutes, washing and drying. This slurry was dried and analyzed.

In a control test, a portion of the 5 percent slip of degritted deflocculated gray clay which had not been treated with calcium chloride and polymeric flocculant was fractionated by sedimentation. The minus 3 micron fraction was analyzed for $TiO_2$ and brightness.

The results for the tests are summarized in Table I.

TABLE I

Purification of Gray Kaolin Clay By Selective Flocculation of Titania

| Product | Recovery, Wt. % | G.E. Brightness, % | $TiO_2$, Wt. %. |
|---|---|---|---|
| (1) −3 micron clay - untreated | 78 | 83.4 | 1.67 |
| (2) −3 micron clay - selective flocculation | 45 | 87.9 | 0.96 |
| (3) (2) after bleaching | — | 90.1 | — |

Data in Table I indicate that almost half of the titania in the minus 3 micron fraction of the clay was removed by selective flocculation and that almost 60 percent of the minus 3 micron content of the clay was recovered in the form of a purified brightened product. The selective flocculation improved the brightness of the fine fraction of clay by 4.5 brightness points. This brightened, purified clay was further brightened to a 90 percent value by oxidation-reduction bleaching.

EXAMPLE II

A portion of a degritted 5 percent solids slip of Example I was partially brightened by dispersing ozone into the slip (1 lb./ton). This slip was deflocculated with the alum-sodium silicate hydrosol as in Example I and agitated intensively for 5 minutes. Portions of the deflocculated slip were treated with various amounts of the solution of calcium chloride, agitated intensively for 5 minutes, a 0.01 percent solution of "Polyhall M-59" added in amounts of 1 or 2 p.p.m., agitated intensively for 1 minute, and then mildly agitated for 30 minutes. In some cases, pH was adjusted to desired values by addition of a 5 percent solution of ammonium sulfate or a 2.5 percent solution of ammonium hydroxide after addition of the polyacrylamide. After 1 ¾ hours, the slip was decanted from a flocculated sediment which had formed and the deflocculated slip was fractionated to minus 5 microns by sedimentation. The minus 5 micron and plus 5 micron fractions were separately dried, weighed and brightness measurements were obtained. In most cases products were analyzed for $TiO_2$.

In a control test, one portion of the ozone-treated slip was fractionated to minus 5 microns and the same tests were performed.

Some of the results for the minus 5 micron fractions are summarized in Table II.

TABLE II

Effect of Reagent Concentration and pH on Flocculation of Anatase From Gray Georgia Kaolin Clay

| Reagents | | | −5 micron Clay Product | | |
|---|---|---|---|---|---|
| $Ca^{++}$, p.p.m. | "Polyhall M-59" p.p.m. | pH | Recovery, wt. % | Brightness, % | $TiO_2$, % |
| — | — | — | 76.8 | 9.1 81.5 | 1.82 |
| — | 1 | 9.1 | 79.2 | 81.4 | 1.85 |
| 50 | — | 9.1 | 76.6 | 80.2 | 1.80 |
| 25 | 1 | 9.1 | 77.3 | 81.7 | 1.72 |
| 100 | 1 | 8.9 | 54.2 | 83.1 | 1.43 |
| 50 | 2 | 9.1 | 55.0 | 83.4 | 1.54 |
| 50 | 2 | 8.5* | 43.5 | 83.7 | 1.39 |
| 50 | 2 | 8.2* | 32.4 | 84.4 | 1.27 |
| 50 | 2 | 9.5** | 57.7 | 82.1 | 1.52 |
| 50 | 2 | 10.0** | 55.0 | 81.0 | — |

\* pH adjustment made with $(NH_4)_2SO_4$
\*\* pH adjustment made with $NH_4OH$

Data in Table II show that calcium ion and weakly anionic polyacrylamide were incapable of effecting purification or brightening of the clay when used individually. When the polyelectrolyte was present in amount of only 1 p.p.m. with 100 p.p.m. $Ca^{++}$, almost one-quarter of the titania was removed and the clay was brightened significantly. When 2 p.p.m. polyelectrolyte was used, 50 p.p.m. $Ca^{++}$ sufficed to remove an appreciable amount of the colored titania impurity.

Data in Table II also show that when using suitable proportions of calcium salt and polyacrylamide (50 p.p.m. $Ca^{++}$ and 2 p.p.m. polymer, respectively) the brightness of the fine size fraction of purified clay and the titania content of such clay were impaired when pH exceeded 9.1 during flocculation. At a pH of 10.0 the clay was not improved in brightness. As pH was decreased to values below 9.1, brightness and titania removal was improved; however, the recovery of purified clay was decreased.

EXAMPLE III

The following tests were carried out to demonstrate the effect of settling time on removal of titania from kaolin clay by the process of the invention.

In these tests portions of the slip flocculated with 50 p.p.m. $Ca^{++}$ and 2 p.p.m. "Polyhall M-59" (Example II) were further aged for 18 hours and 42 hours without agitation before siphoning slips of deflocculated purified clay from the colored flocs and fractionating the slips.

The results summarized in Table III show that substantial improvement in titania removal was effected by extending the settling time after flocs formed for 18 hours. The data also indicate a settling time of 42 hours was no better than 18 hours.

TABLE III

Effect of Settling Time on Separation of Titania From Gray Georgia Kaolin Clay by Selective Flocculation *

| Settling Time, hr. | Minus 5 micron fraction | | |
|---|---|---|---|
| | Recovery, wt. % | Brightness, % | $TiO_2$, % |
| 1 ¾ | 55.0 | 83.4 | 1.54 |
| 18 | 45.9 | 84.2 | 1.33 |
| 42 | 44.1 | 84.1 | — |

* 50 p.p.m. $Ca^{++}$; 2 p.p.m. "Polyhall M-59" at pH 9.1

Thus it has been shown that a colored titania impurity can be removed from a slip of deflocculated impure clay by selectively floccing the colored impurity with trace quantities of polyvalent cations and a high molecular weight synthetic organic polyanionic flocculating agent. This result was surprising and unexpected because the polymers that are useful are well known as a flocculating agent for kaolin clay. The use of such polyelectrolytes would have been expected to result in the undesirable flocculation of the clay as a whole or the selective flocculation of the clay rather than the selective flocculation of a colored titania impurity which was realized.

I claim:

1. A method for purifying kaolin clay containing finely divided particles of a titania impurity which comprises dispersing said impure clay in water to form a neutral or mildly alkaline dispersed clay slip, incorporating a water-soluble synthetic organic weakly anionic polymeric flocculant in amount sufficient to flocculate selectively the finely divided particles of titania impurity incorporating a soluble compound containing polyvalent metal cations prior to incorporation of said polymeric flocculant to facilitate flocculation by said polymeric flocculant, agitating the slip mildly until flocs form and settle to the bottom of the slip and separating the flocs from the slip.

2. The method of claim 1 wherein said polymer is polyacrylamide containing carboxylic groups.

3. The method of claim 1 wherein said polyvalent cation is divalent.

4. The method of claim 3 wherein said polyvalent cation is calcium.

5. The method of claim 1 wherein the clay is deflocculated with a reagent comprising sodium silicate.

6. The method of claim 5 wherein the pH of the slip after addition of said source polyvalent cations and polymer is within the range of 8.0 to 9.5.

7. The method of claim 1 wherein said polyvalent cation is calcium present in concentration within the range of 10 to 200 p.p.m. and the flocculant is weakly anionic polyacrylamide present in concentration within the range of ¼ to 5 p.p.m.

8. The method of claim 7 wherein the calcium ion concentration is within the range of 50 to 100 p.p.m. and the polyacrylamide concentration is within the range of ¾ to 4 p.p.m.

9. The method of claim 7 wherein said clay is hard gray Georgia kaolin.

* * * * *

UNITED STATES PATENT OFFICE
CERTIFICATE OF CORRECTION

Patent No. 3,701,417     Dated October 31, 1972

Inventor(s) Venancio V. Mercade

It is certified that error appears in the above-identified patent and that said Letters Patent are hereby corrected as shown below:

Page 1 - under "UNITED STATES PATENTS", "2,353,055" should read -- 2,358,055 --.

Column 5 - line 12, "N sodium silicate" should read -- "N"® sodium silicate --.

Column 6 - Table II - line 51,

| "  | -- | --   | 76.8 | 9.181.5 | 1.82" should read |
| -- | -- | ---- | ---- | ------- | ----------------- |
| -- | -- | 9.1  | 76.8 | 81.5    | 1.82 --.          |

Column 8 - line 20, "titania impurity incorporating" should read -- titania impurity, incorporating --.

Signed and sealed this 27th day of March 1973.

(SEAL)
Attest:

EDWARD M. FLETCHER, JR.          ROBERT GOTTSCHALK
Attesting Officer                Commissioner of Patents